Jan. 18, 1966  L. I. DAVIS  3,230,421
PHOTOELECTRIC TARGET FOR MARKSMANSHIP AIM TRAINING AID
Filed Oct. 6, 1961  3 Sheets-Sheet 1
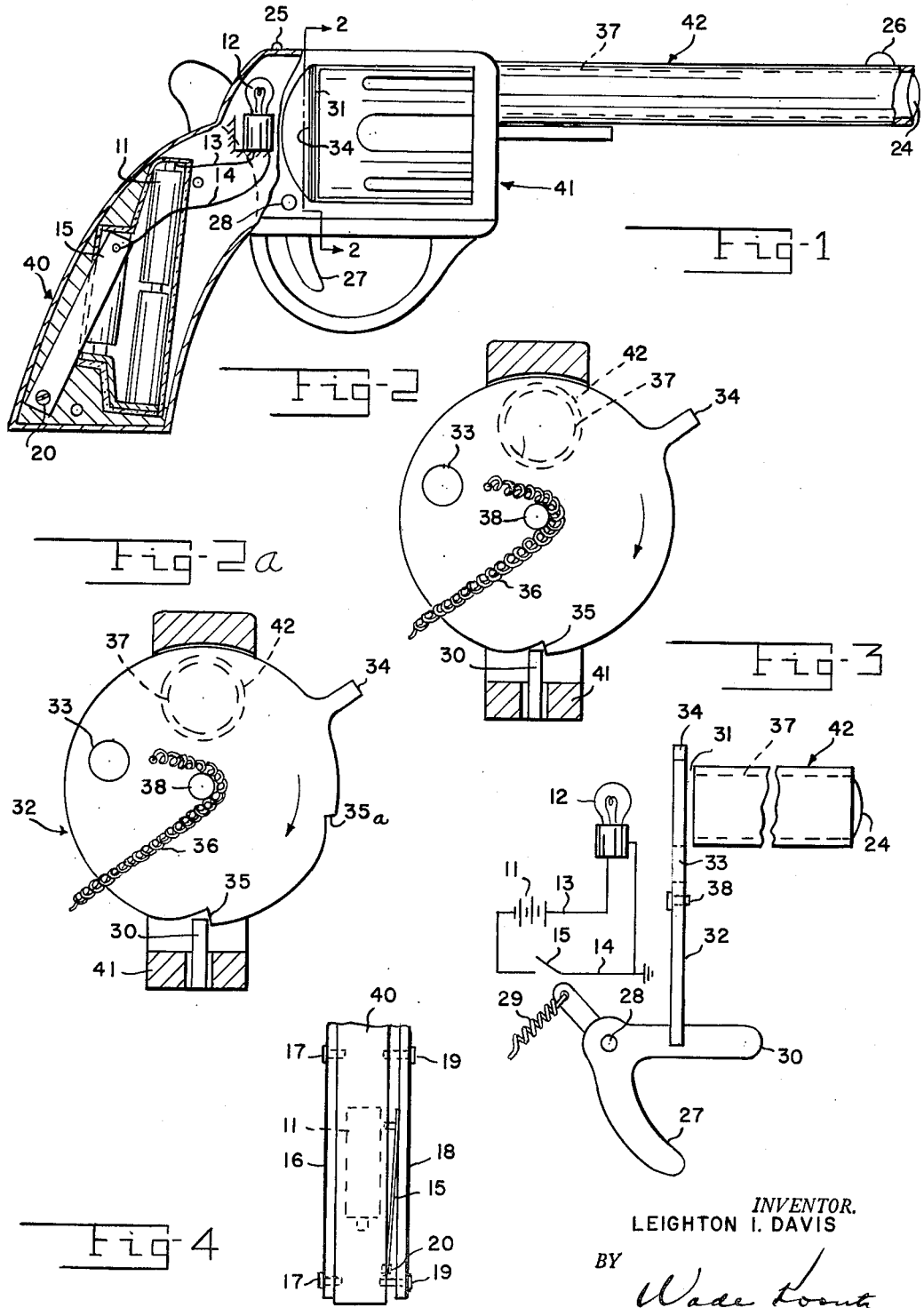
INVENTOR.
LEIGHTON I. DAVIS
BY Wade Koontz
ATTORNEY Jan. 18, 1966  L. I. DAVIS  3,230,421
PHOTOELECTRIC TARGET FOR MARKSMANSHIP AIM TRAINING AID
Filed Oct. 6, 1961  3 Sheets-Sheet 2
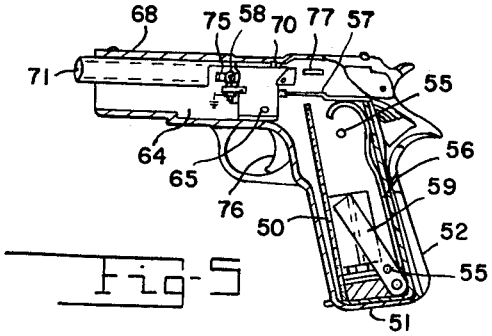
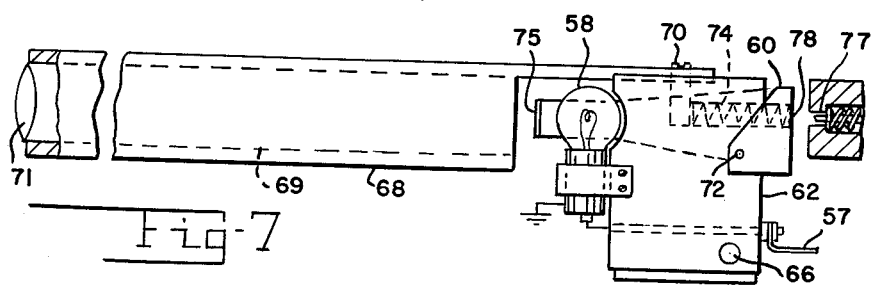
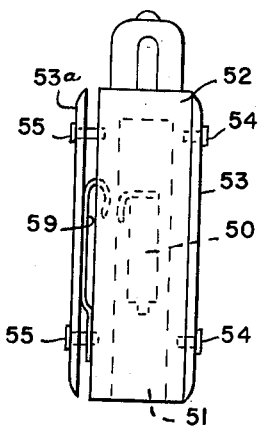
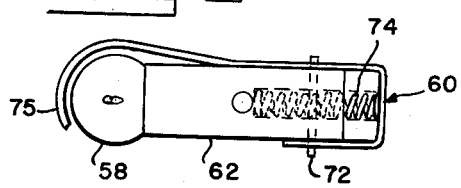
INVENTOR.
LEIGHTON I. DAVIS
BY
ATTORNEY Jan. 18, 1966             L. I. DAVIS             3,230,421

PHOTOELECTRIC TARGET FOR MARKSMANSHIP AIM TRAINING AID

Filed Oct. 6, 1961             3 Sheets-Sheet 3

*INVENTOR.*
LEIGHTON I. DAVIS

BY
ATTORNEY

United States Patent Office 3,230,421
Patented Jan. 18, 1966

3,230,421
PHOTOELECTRIC TARGET FOR MARKSMANSHIP AIM TRAINING AID
Leighton I. Davis, 45 Azalea Drive, Eau Gallie, Fla.
Filed Oct. 6, 1961, Ser. No. 143,515
5 Claims. (Cl. 315—149)
(Granted under Title 35, U.S. Code (1952), sec. 266)

The invention described herein may be manufactured and used by or for the United States Government for governmental purposes without payment to me of any royalty thereon.

It is frequently desirable to practice shooting and aiming of a gun without expending live ammunition, which is costly and requires certain safeguards due to its inherent dangerous nature. A light ray projector resembling the shape and operation of a gun has previously been used to simulate the firing and aiming of a gun for training and practice purposes. A target sensitive to the light ray emitted from the light ray projector has also been provided to indicate, in some form, the accuracy of the operator of the light ray projector.

Accordingly, the present invention relates to an aim indicator employing a novel light ray projector gun that has a trigger actuated shutter and produces a short pulse of light which accurately simulates the firing of a bullet. The present invention also relates to a novel photoelectric target which produces a positive indication when the short pulse of light emitted from the light ray projector gun hits the bull's-eye of the target.

Two embodiments of light projector guns are disclosed and described herein. One embodiment relates to a revolver that has a trigger actuated rotating shutter. A light source is located behind the shutter and is energized prior to the rotation of the shutter. When the trigger of the revolver is depressed, the shutter is released and rotates, and a pluse of light is emitted from the barrel of the revolver as an aperture in the shutter passes the bore of the barrel of the revolver.

The second emobdiment utilizes a standard .45 caliber service pistol which is modified by removing the barrel, magazine and slide drive spring. The pistol is provided with a barrel extension tube, a shutter mechanism, a switch operated light source and a battery supply for the light source. The light source is located behind the shutter and is energized from the battery source by operation of its switch prior to release of the shutter. The shutter is activated by the firing pin which is released by depressing the trigger. Upon actuation of the shutter a pulse of light is emitted from the extension barrel tube of the pistol.

The object of this invention is to provide apparatus which simulates the aiming and firing of a gun.

Another object is to provide a light projecting device which enables the operator to practice aiming and firing of a firearm without the expenditure of live ammunition.

A still further object of this invention is the provision of a light projecting pistol which emits an exact pulse of light when the trigger of the pistol is depressed.

Another object of this invention is the provision of a light projecting revolver which emits an exact pulse of light when the trigger of the revolver is depressed.

A still further object of this invention is to provide a light projecting device which is incorporated into a standard service piston without any mechanical changes to the service pistol.

Still another object of this invention is the provision of a new and novel photoelectric detector target.

Another object of this invention is a target practice game using a novel light pulse emitting gun and a new and novel photoelectric target which gives a positive visual indication when a light pulse from the projector strikes the bull's-eye of the target.

Further objects and advantages are within the scope of my invention, such as relate to the arrangement, operation and function of the related elements, to various details of construction and to combination of parts, elements per se, and to economics of manufacture and numerous other features as will be apparent from a consideration of the specification in conjunction with the drawings disclosing the specific embodiments of the invention.

In the accompanying drawings,

FIGURE 1 is an elevation view of a revolver incorporating elements of the invention.

FIGURE 2 is an illustration of the shutter and its operating mechanism of the revolver of FIGURE 1.

FIGURE 2a is a view of the shutter and the operating mechanism of a second embodiment of the revolver of FIGURE 1.

FIGURE 3 is an illustration of the manner of operation of the trigger and shutter of the revolver of FIGURE 1.

FIGURE 4 is a partial left end view of the revolver of FIGURE 1.

FIGURE 5 is an elevation view of the pistol embodiment with elements of the invention incorporated therein.

FIGURE 6 is a right hand end view of the pistol of FIGURE 5.

FIGURE 7 is an illustration of the lamp, shutter mechanism, barrel and firing pin of the pistol of FIGURE 5.

FIGURE 8 is a top view of the shutter mechanism.

Figures 9, 9A:
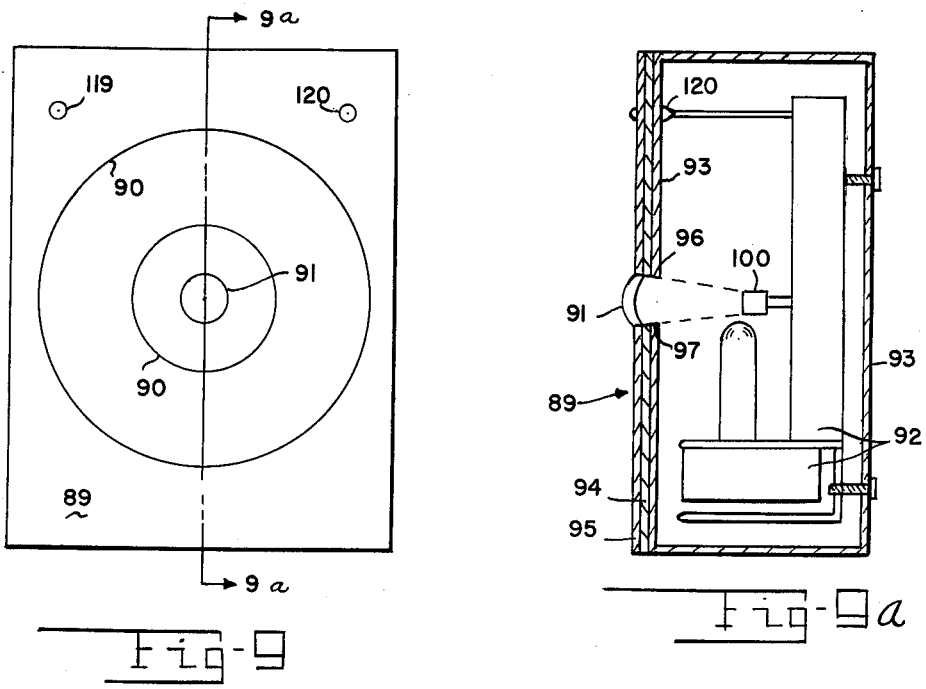
FIGURE 9 is a front elevation view of the photoelectric target.
FIGURE 9a is a view of the photoelectric target taken along line 9a—9a of FIGURE 9.

The light projector revolver is illustrated in FIGURES 1 to 4. This revolver comprises a handle 40, a middle portion frame 41 and a barrel 42. The handle 40 has a battery pack 11 insulatedly mounted therein and is provided with plastic covers 16 and 18 secured to the handle in a manner explained below. The revolver may be constructed of either a plastic or a metallic material.

A lamp 12 is mounted in frame 41 in an aligned position with barrel 42. Lamp 12 is energized from battery pack 11 through wires 13 and 14 and is provided with a switch that operates to light the lamp 12 whenever the handle 40 of the revolver is grasped by the user thereof. This switching operation is accomplished, for example, with the aid of a spring 15 that is pressed against a terminal of the battery pack 11 by plastic cover 18. This plastic cover is loosely mounted on handle 40 by means 19 and is biased away from the handle 40 by the spring 15. When the handle is grasped, the cover 18 is pressed against the spring 15 which in turn contacts a negative terminal of the battery pack connecting this terminal to the lamp 12 thru the wire 14. The positive terminal of the battery is connected to lamp 12 by the wires 13. The other plastic cover 16 may be rigidly secured to handle 40 by means 17.

A barrel 42 extends longitudinally from frame 41 of the revolver and has a lens 24 secured at its end. This lens serves to focus the light from lamp 12 that passes through the bore 37 of barrel 42 onto a distant target. The revolver also contains target sights 25, 26 mounted and located in a conventional manner.

A pulse of light is emitted from lens 24 by the operation of a shutter 32 located between lamp 12 and the barrel 42. The shutter is secured to frame 41 by means 38 and is biased by spring 36 to rotate clockwise about means 38 in the slot 31 of the frame 41. Shutter 32, shown in the cocked position in FIGURE 2, has an aperture 33, a cocking ear 34, and an abutment 35. The shutter rotation is controlled by trigger 27 which has a sear portion 30 and is pivotally mounted about pin 28 in frame 41. The trigger is biased by spring 29 so as to normally remain in the forward position. Sear 30 is positioned against abutment 35 of the shutter 32 and retains the shutter in a cocked mode against the bias of the spring 36.

When the trigger 27 is pulled back, or depressed, it is pivoted about pin 28 and the sear 30 releases the abutment 35. Spring 36 then forces the shutter to rotate in a clockwise direction until cocking ear 34 strikes frame 41, the frame acting as a stop for the rotation of the shutter. This operation results in rotating the aperature 33 of the shutter past the bore 37, uncovering the lamp 12 for a short period of time thereby emitting a pulse or flash of light from lens 24. Aperture 33 may be a square or angular cut out portion of shutter 32 as well as the circular aperture shown in the drawings.

The trigger 27 springs forward when it is released returning sear 30 to its normal position. The shutter 32 is then recocked by manual rotation of the cocking ear in a counterclockwise direction until the sear 30 is again positioned against abutment 35. The revolver may now be "fired" again to emit another light pulse. The lamp 12 remains lit as long as the handle is grasped by the user, therefore, the duration of the light pulse is accurately determined by the size of aperture 33 in relation to bore 37 and the velocity of rotation of the shutter 32.

The shutter system has a unique advantage in that the gun may be "boresighted" which is extremely useful as a training aid. Shutter 32 may be kept opened manually to emit a continuous ray of light while the trainee is aiming the revolver. The trainee by observing the spot of light impinging on a target can determine any boresight error, and how much "bead" to hold on the target. Shutter 32 may be provided with an auxiliary abutment 35a as shown in FIGURE 2a located at such a position that aperture 33 will be aligned with bore 37 when abutment 35a is in contact with sear 30. It is preferable that abutment 35a be smaller than abutment 35 to assure that abutment 35a will clear the sear 30 and will not interfere with the normal light pulse type of operation, previously described. Alternatively, the auxiliary abutment may be replaced by a lock (not shown) to hold the shutter open while "boresighting."

The pistol type of light projector is illustrated in FIGURES 5 to 8. The pistol shown in these figures is a standard U.S. .45 caliber automatic pistol described, in detail, for example, on pages 686 to 693 of "Small Arms of the World," by W. H. Smith, 1955 edition. The barrel, magazine and slide drive spring is first removed from the service pistol and a substitute barrel 68, magazine 51, and support 62 containing a lamp 58 and shutter 60 is inserted in the pistol.

The substitute magazine 51 resembles the standard magazine of the service pistol in size and shape, and fits into handle 52 in much the same manner as the standard magazine. Substitute magazine 51 contains a battery pack 50 and also contains an insulated spring 56 which is connected to a positive terminal of the battery pack 50. Spring 56 contacts a spring 57 of the plastic insert block 62 when the substitute magazine 51 is fully inserted in handle 52. Spring 57 is insulated from the metallic parts of the pistol and is electrically connected to one terminal of lamp 58. The lamp energization circuit is completed by connecting the negative terminal of the battery pack 50 to the second terminal of the lamp by way of a control switch, or alternatively, the second terminal of the lamp may be grounded to the pistol frame and the negative terminal of the battery pack may be grounded through a switch. This latter method is described below.

A switch consisting of a spring 59, fastened at one end to handle 51, is positioned so as to ground the negative terminal of the battery pack 50 when the handle 51 is grasped by an operator of the light projector. The spring 59 is activated by plastic cover 53a in much the same manner explained above in connection with the revolver. The cover 53a is loosely fastened to handle 51 by means 55 and is biased away from the handle by spring 59. Whenever the handle 52 is grasped by the operator, cover 53a is pressed against spring 59 which in turn contacts the negative terminal of the battery pack, grounding this terminal to the pistol frame. The second terminal of the lamp 58 is also grounded, therefore, the lamp 58 is lit as soon as the pistol is grasped. The other plastic cover 53 is rigidly secured to the handle 51 by means 54.

The lamp 58 and shutter 60 are mounted on the support plastic block 62. This block is inserted into frame 64 of the pistol and is secured therein by barrel retaining pin 65 which fits into the hole 66 of the block 62. An extension tube 68 having a bore 69, constructed of either metal or plastic, is substituted for the barrel of the pistol. One end of this tube is fastened to the plastic block 62 by securing means 70 while the other end has a focusing lens 71 mounted therein by conventional means.

The shutter 60, on block 62, is pivotally mounted about pin 72 and is biased to a horizontal position as shown in FIGURE 7 by spring 74. The front portion 75 of the shutter is opaque and is located between the lamp 58 and the bore 69 of the tube 68 to prevent light from being emitted from the pistol before the trigger 76 of the pistol is depressed.

Trigger 76 actuates inertia firing pin 77 and forces this pin to leave its rest position, strike shutter 60 at point 78, and then return back to the rest position. The mechanism necessary to accomplish this operation of the firing pin and trigger is incorporated in the standard service pistol and forms no part of this invention.

In operation as a training aid, lamp 58 is first lit by the action of plastic cover 53a of handle 52 against spring 59. Trigger 76 is then pulled back in the conventional manner, releasing firing pin 77 which strikes shutter 60 at point 78, forcing the shutter to rotate about the pin 72. Bore 69 of the substitute barrel is thus uncovered and light is emitted from the projector pistol. The firing pin 71 after striking the shutter at 68 returns to a normal rest position. The shutter shortly thereafter also returns to its normal horizontal position under the action of biasing spring 74. The path between the lamp 58 and bore 69 is again blocked by the shutter, resulting in a pulse of light being emitted from the projector for the duration of time that the shutter was removed from path between the lamp and the bore.

The photoelectric target is shown in FIGURES 9 and 9a. This target comprises a front surface 89 which has spaced concentric rings 90 printed thereon and a bull's-eye 91. A case 93 supports front surface 89 and contains an electron package 92 that has the sensing, amplifying and indicator circuit and necessary power supply mounted therein.

The bull'e-eye 91 of the front surface 89 is a lens which focuses the incident light rays on photocell 100. This photocell is part of the electron package 92 and is mounted in this package with its light sensitive surface facing bull's-eye lens 91. The remaining portion of the front surface is made of light reflective material so that the location of an incident pulse of light can be spotted by the operator of the light projector gun. This reflective surface may be a coating of reflective paint or alternately may be made of a clear glass or plastic cover overlying an opaque sheet of paper.

FIGURE 9a illustrates an arrangement that has proved successful to reflect an incident pulse of light from the light ray projector with sufficient intensity to indicate the portion of the target "hit" by the operator of the gun. The bull's-eye lens 91 is mounted in a centrally located aperture of a clear Plexiglas cover 95 and is secured therein by conventional means. A sheet of paper 94 with a cutout portion 96 of equal diameter to bull's-eye lens 91 and with concentric circles 90 printed on it is inserted between plastic cover 95 and case 93. Paper 94 and cover 95 are secured to the case 93 which also has an opening 97 aligned with bull's-eye lens 91 and cutout portion 96. Neon bulbs 119 and 120 of the indicator circuit protrude through the case 93, paper 94, and cover 95, and provide an alternative blinking or winking indication when the bull's-eye lens 91 is "hit" by a pulse of light, in a manner more fully set out below.

Figure 10:
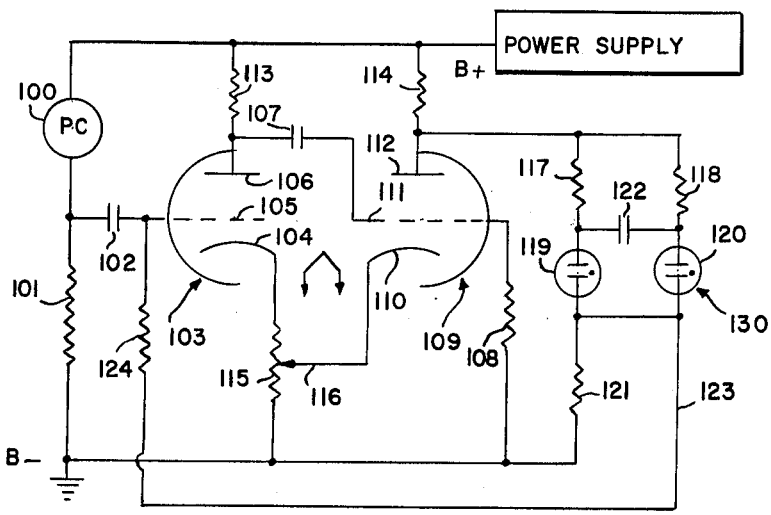
FIGURE 10 is the circuit diagram of the sensing, amplifier and indicating circuit of the instant invention.

The sensing, amplifier and indicator circuit is shown in detail in FIGURE 10. Power is supplied to this circuit by power supply 99 which may be a battery source, or alternatively, may be of the rectifier type to convert a 110 volt A.C. line to the desired operating voltages. The power supply and the sensing, amplifier and indicator circuit are both a part of the electron package 92.

The sensing, amplifier and indicator circuit of FIGURE 10 contains a photoelectric cell 100 connected between the supplied plate voltage and load resistor 101. The other end of this resistor is connected to B⁻ or ground. A pulse of light impinging on photoelectrical cell 100 decreases the resistance of the cell and increases the current flow through the cell and resistor 101. The corresponding voltage change across the load resistor 101 is applied to grid 105 of tube 103 through capacitor 102. The amplified output of tube 103 is obtained at plate 106 and is applied to the grid 111 of tube 109 through the coupling circuit comprising capacitor 107 and resistor 108. Plate voltage for the tubes 103 and 109 is supplied through resistors 113 and 114, respectively. Cathode coupling is also provided between tubes 103 and 109 by a biasing potentiometer 115 located between the cathode 104 of tube 103 and ground. The movable arm 116 of the potentiometer is connected directly to the cathode 110 of tube 109.

The output of the amplifier section obtained at plate 112 is applied to the indicator circuit 130 which comprises the resistors 117 and 118, neon bulbs 119 and 120, capacitor 122, and resistor 121. The neon bulbs 119 and 120 are each connected in a series path with resistors 117 and 118, respectively. These two series paths are connected in parallel with their resistive ends contacting plate 112 and the neon bulb end contacting resistor 121. The other end of resistor 121 is grounded. The capacitor 122 is connected between the junctions of the resistors 117, 118 and neon bulbs 119, 120 of each parallel path. A feedback path comprising line 123 and resistor 124 obtained between the junction of the resistor 121 and the two parallel paths is applied to the grid 105 of tube 103.

In operation, tube 103 is normally nonconductive or is slightly conductive and tube 109 is normally conducting heavily. When a pulse of light impinges on photocell 100 a positive pulse is applied to grid 105 and tube 103 begins to conduct heavily thereby lowering the potential on plate 106. This change in potential drives grid 111 to a lower value annd results in a corresponding rise of potential at plate 112. The increase in potential at plate 112 is applied to the indicator circuit 130 and neon bulbs 119 and 120 flash alternatively for the reason more fully set out below. The coupling RC circuit of resistor 108 and capacitor 107 between plate 106 and grid 111 has a long time constant which functions to maintain the blinking indication of the neon bulbs for a longer time than the period of the applied pulse of light. The length of time that the blinking action occurs is also increased by the regenerative feedback path 123, 124. This feedback path drives the grid 105 of tube 103 more positive and therefore also drives the plate 112 of tube 109 to a higher positive voltage which aids in maintaining the blinking indication of the neon bulbs for an appreciable time.

The cathode coupling between tubes 103 and 109 through the potentiometer 115 provides an additional regenerative path between these tubes and helps increase their voltages and amplification. The amount of cathode coupling can be adjusted by the movable arm 116 of the potentiometer. When the regenerative cathode coupling is increased, the grid to cathode bias of tube 109 is increased and hence the plate voltage of tube 109 is also increased. This potentiometer also affords a method of adjusting for varying plate supply voltages from the power supply and is a control over the sensitivity of the sensing, amplifying and indicator circuit.

The coupling circuit of resistor 101 and capacitor 102 between photoelectric cell 100 and grid 105 also serves to decouple tube 103 from the signals generated by different levels of the environmental lighting. In addition, the time constant of capacitor 102 and resistor 101 is sufficiently short so as to discriminate against a 120 cycle signal arising from environmental lights that operate from a 60 cycle source.

The indicator circuit 130 can be considered to be a free running multivibrator. If a D.C. potential of sufficient magnitude is applied across the indicator circuit, one of the neon bulbs 119, 120 will fire, or glow and, in so doing, the voltage across the other bulb will be reduced. Assuming that bulb 119 fires first, current will be supplied to this bulb through a first path consisting of the series resistor 117 and also through a second path consisting of resistor 118 and capacitor 122. As the capacitor 122 is charged the amount of current supplied to neon bulb 119 through this second path will decrease. After a predetermined time there will be an insufficient amount of current to sustain the glow of neon bulb 119 and this glow will be extinguished. The charge accumulated on capacitor 122 is now discharged through resistors 117 and 118. The polarity of this discharge across resistor 117 opposes the applied D.C. potential and prevents bulb 119 from firing again, while the polarity of this discharge across resistor 118 aids the applied D.C. voltage to bulb 120. Therefore, bulb 120 will now fire, or break down, drawing current from two paths, in the same manner as explained above. Capacitaor 122 will again be charged, but this time in a direction opposite to its first charge. The glow extinction operation with respect to bulb 120 is the same as the glow extinction operation of bulb 119, therefore, after a predetermined time bulb 120 will stop glowing and capacitor 122 will again be discharged. The discharge of this capacitor will in turn cause bulb 119 to break down and the cycle will be repeated. The alternating breakdown or glow of bulbs 119 and 120 continues as long as an input voltage of sufficient magnitude is applied to the indicator circuit. This applied voltage obtained from the plate 112 is of sufficient magnitude and duration to maintain the blinking indication of the indicator circuit for an appreciable time whenever a short pulse of light strikes photocell 100.

Representative components and values of the sensing, amplifying and indicator circuit are:

| | |
|---|---|
| Resistor 101 | 2.4 meg. |
| Resistor 108 | 18 meg. |
| Resistor 113 | 47K. |
| Resistor 114 | 100K. |
| Resistor 117 | 220K. |
| Resistor 118 | 220K. |
| Resistor 121 | 27K. |
| Resistor 124 | 1.0 meg. |
| Capacitor 102 | .005 ufd. |
| Capacitor 107 | .1 ufd. |
| Capacitor 122 | .1 ufd. |
| Potentiometer 115 | 2000 ohms. |
| Tube 103, 109 | 12AX7 or 12AU7. |
| Neon bulbs 119, 120 | NE2. |
| Photocell | Clairex Model CE1. |

Either the pistol or revolver type light ray projector may be used with the sensing, amplifier and indicating circuit as both these guns emit a short pulse of light when their triggers are depressed. The lamp in both these embodiments is energized prior to release of the trigger which allows control of the duration of the emitted light light pulse by the shutter in each gun. Operation in a darkened environment enhances the operation of both these light projectors and the photoelectric target.

The lamp within the frame of the gun may be energized from a power source other than the battery pack shown in the drawing. For example, a two wire line and socket may be attached to the lamp in the gun and a 110 volt power line may be used as the power source for the lamp.

While the invention is shown and described in connection with specific forms for illustration rather than restrictive purposes, it is obvious that minor changes and modifications may be made by those skilled in the art without departing from the scope and spirit of the invention as defined in the accompanying claims.

I claim:

1. A photoelectric target for detecting and indicating an incident pulse of light comprising a photoelectric cell for detecting and forming an electric pulse in response to said incident light pulse; a two-stage amplifier having an input and an output, said photoelectric cell being connected to said input of said two-stage amplifier to amplify said electric pulse; a neon bulb indicator means connected in series with a load resistor, said indicator means and said load resistor connected to the output of said two-stage amplifier in such a manner that said indicator means is normally non-conductive but rendered conductive in response to said amplified electric pulse to produce a visual indication of the detected light pulse; and regenerative feedback means connected from the junction of said indicator means and said load resistor to the input of said two-stage amplifier whereby the conduction time of said two-stage amplifier is lengthened for a period appreciably longer than the period of said electric pulse.

2. In the photoelectric target of claim 1, said neon bulb indicator means comprising a first series path of a first resistor and a first neon bulb, a second series path of a second resistor and a second neon bulb, means connecting said series paths in parallel, a condenser connected between the junction of the resistor and neon bulb of each series path, said resistor end of said parallel circuit being connected to the output of said two-stage amplifier, and the neon bulb end of said parallel connected series paths connected to said load resistor.

3. In the photoelectric target of claim 1, said two-stage amplifier including a first stage consisting of a discharge device having an anode, cathode and grid and a second stage consisting of a discharge device having an anode, cathode and grid; said photoelectric cell connected to the grid of the first stage; a power supply means connected to the anodes of said first and second stages; a capacitor-resistor coupling network having a long time constant connecting the anode of said first stage to the grid of said second stage; and potentiometer means interconnecting the cathodes of said first and second stages.

4. A photoelectric target for detecting and indicating an incident pulse of light comprising a photoelectric cell for detecting said incident light pulse; a power supply, said power supply being connected to said cell so that an electric pulse is formed in response to the detection of said incident pulse of light on the cell; a two-stage amplifier having input, output and power supply terminals, means connecting said photoelectric cell and said power supply to the input and the power supply terminals, respectively, of said two-stage amplifier to amplify the electric pulse; a neon bulb indicator circuit serially connected to a load resistor, means connecting said indicator circuit and said load resistor to said power supply and to the output terminals of said two-stage amplifier in such a manner that said indicator circuit is normally non-conductive but rendered conductive in response to said amplified electric pulse to produce a visual indication of the detected light pulse thereon; and regenerative feedback means connected from the junction of said indicator circuit and said load resistor to the input terminal of said two-stage amplifier so that the conduction time of the two-stage amplifier is lengthened for a period appreciably longer than the period of said electric pulse.

5. A photoelectric target for detecting and indicating an incident pulse of light comprising a photoelectric cell for detecting and forming an electric pulse in response to said incident light pulse; a two-stage amplifier having an input and an output, said photoelectric cell being connected to said input of said two-stage amplifier to amplify said electric pulse; a neon bulb indicator means connected to the output of said two-stage amplifier in such a manner that said indicator means is normally non-conductive but rendered conductive in response to said amplified electric pulse to produce a visual indication of the detected light pulse; regenerative feedback means connected from said indicator means to the input of said two-stage amplifier whereby the conduction time of said two-stage amplifier is lengthened for a period appreciably longer than the period of said electric pulse; said neon bulb indicator means comprising a first series path of a first resistor and a first neon bulb, a second series path of a second resistor and a second neon bulb, means connecting said series paths in parallel, a condenser connected between the junction of the resistor and neon bulb of each series path, said resistor end of said parallel circuit being connected to the output of said two-stage amplifier, ana a load resistor connected to the neon bulb end of said parallel connected series paths; said two stage amplifier comprising a first stage consisting of a discharge device having an anode, cathode and grid and a second stage consisting of a discharge device having an anode, cathode and grid; a capacitor-resistor coupling network having a long time constant connecting the anode of said first stage to the grid of said second stage; a power supply means connected to the anodes of said first and second stages; and potentiometer means interconnecting the cathodes of said first and second stages, said regenerative feedback means comprising a resistor electrically connected between the neon bulb end of the parallel circuit of said indicator and the grid of the first stage of said two-stage amplifier.

References Cited by the Examiner

UNITED STATES PATENTS

| | | | |
|---|---|---|---|
| 2,269,258 | 1/1942 | Falkenberg | 273—101.1 |
| 2,310,328 | 2/1943 | Swift | 331—130 |
| 2,431,394 | 11/1947 | Friedman | 315—149 |
| 2,476,389 | 7/1949 | Schmidt | 315—157 |
| 2,536,484 | 1/1951 | Avery | 240—10.62 |
| 2,569,594 | 10/1951 | Aagesen | 273—101.1 |
| 2,593,942 | 4/1952 | Vliet et al. | 240—10.62 |
| 2,632,855 | 3/1953 | Benz | 315—157 |
| 2,710,754 | 6/1955 | Varney | 273—101.1 |
| 2,906,938 | 9/1959 | Stellmacher | 331—130 |
| 2,926,015 | 2/1960 | Edrich | 273—102.2 |
| 2,939,706 | 6/1960 | Skaredoff | 273—102.2 |
| 3,005,915 | 10/1961 | White et al. | 250—114 |

JOHN W. HUCKERT, *Primary Examiner.*

DELBERT B. LOWE, *Examiner.*

J. PLAUT, R. H. EPSTEIN, *Assistant Examiners.*